UNITED STATES PATENT OFFICE.

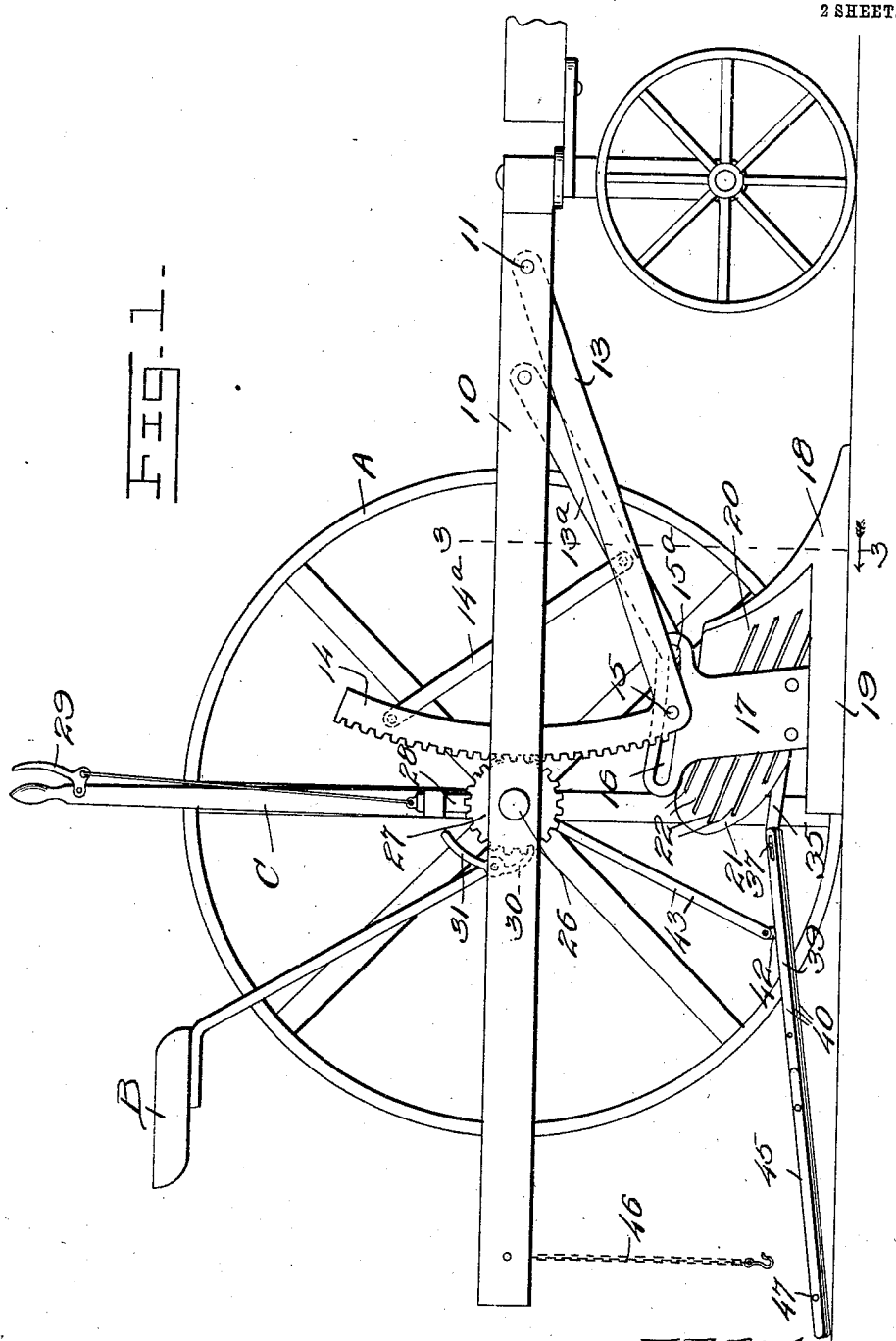

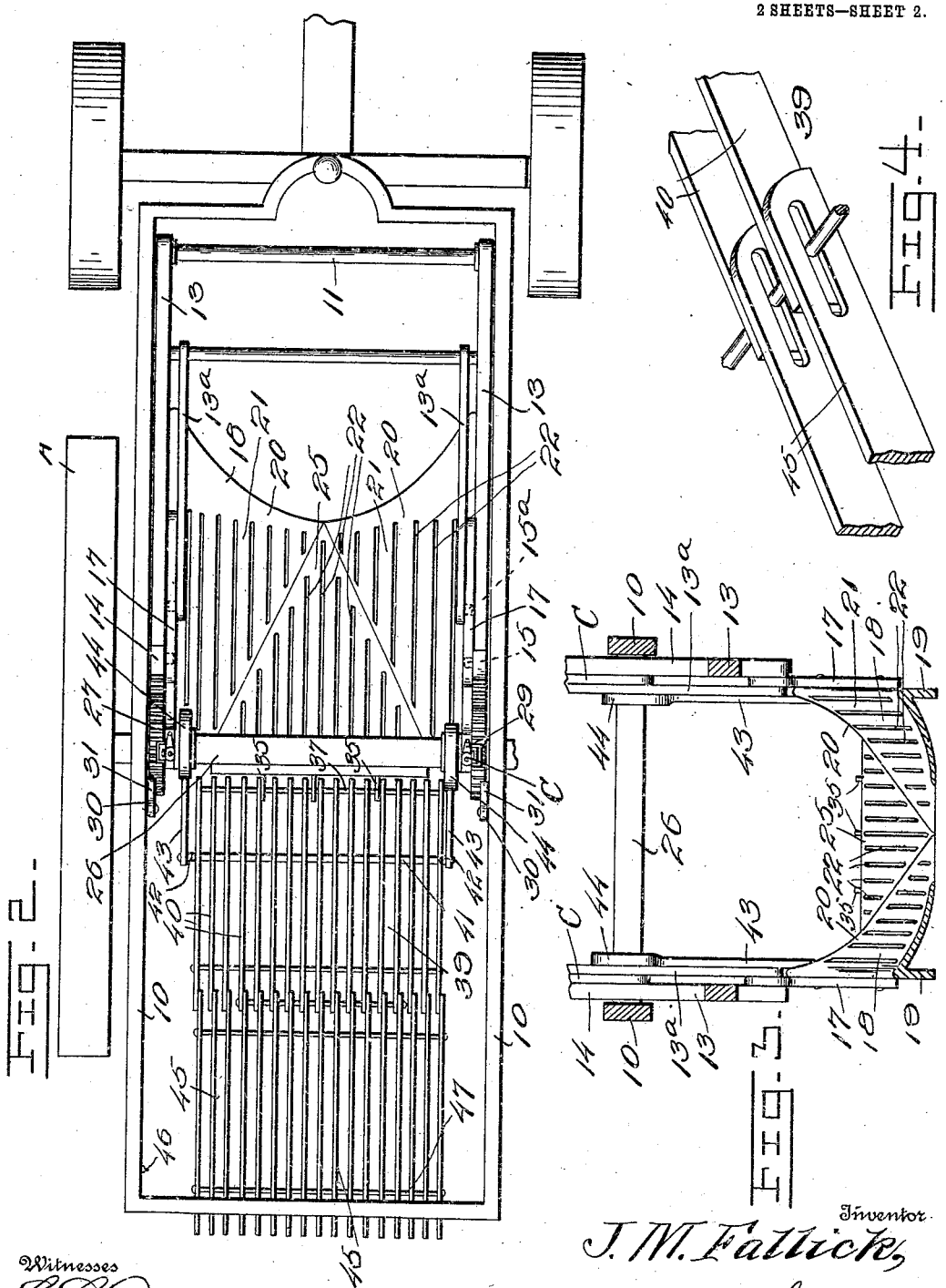

JOHN M. FALLICK, OF BEAVER FALLS, PENNSYLVANIA.

POTATO-DIGGER.

954,024.  Specification of Letters Patent.  Patented Apr. 5, 1910.

Application filed March 23, 1909. Serial No. 485,279.

*To all whom it may concern:*

Be it known that I, JOHN M. FALLICK, a citizen of the United States, residing at Beaver Falls, in the county of Beaver and State of Pennsylvania, have invented certain new and useful Improvements in Potato-Diggers, of which the following is a specification.

This invention relates to potato diggers, and has for its object to provide a novel suspension for the plow of the digger, and simple means for adjusting the plow vertically.

Another object is to provide a novel form of screen and connections.

Another object is to provide a novel form of suspension for the screen.

A most important object of the invention is to provide a suspension which is operable for the vertical adjustment of the plow, and at the same time serves as a direct draft connection to the plow.

Other objects and advantages will be apparent from the following description and it will be understood that changes in the specific structure shown and described may be made within the scope of the claims without departing from the spirit of the invention.

In the drawings forming a portion of this specification, and in which like characters of reference indicate similar parts in the several views, Figure 1 is a side view of the device with one of the wheels removed, Fig. 2 is a top view of the device, Fig. 3 is a cross sectional view through the plows on the line 3—3 of Fig. 1, Fig. 4 is a detailed view of the pivotal connections between the screens, and between the forward screen and the plow.

Referring to the drawings, there is shown a wheeled frame 10 carrying a transverse shaft 11 adjacent its forward end. Pivotally suspended on the shaft adjacent its opposite end portions there are link members 13 having integral upwardly extending rack segments 14 at their free ends, their rack teeth extending rearwardly as shown. At the junction of the segments 14 and the links 13, there are horizontal outwardly extending pivot pins 15 engaged slidably in longitudinally extending slots 16 formed in plow-supporting members 17 disposed at opposite sides of the machine and carrying plows 18 having outwardly disposed land sides 19 and inwardly disposed mold boards 20 20. The inner edges of the mold boards 20 are connected as usual in such constructions. The plows are each provided with a rearwardly extending screen portion 21 having longitudinally extending slots 22. The screens 21 are inclined upwardly toward the sides of the machine, their lower edges being directed upwardly at an angle from the horizontal and joining their upper edges at some distance rearwardly of the plows, forming a V-shaped space between the screens. A third screen 25 having a V-shaped forward end portion is engaged snugly in the space between the screens 21, being approximately horizontal and having similar longitudinally extending slots 22. The screens 21 and 25 are securely coengaged in rigid relation.

The frame 10 is supported centrally upon a shaft 26 carried by the rear enlarged wheels A of the machine, and revolubly engaged upon this shaft inwardly of each wheel and in mesh with the rack segments 14 there is a gear 27 inwardly of which there is pivoted a lever C carrying a slidable pawl 28 adjacent its inner end engaged with the teeth of the gear 27, and operable by a hand release 29 disposed adjacent the handle of the lever. Carried by the frame 10, there is a suitable pivoted dog 30 engaged with the gear 27 having an upwardly extending and inwardly offset foot-engaging portion 31 outwardly of its pivotal point, convenient for operation by the foot of an operator seated upon the seat B disposed centrally of the machine rearwardly of the shaft 26, and which may be supported upon the frame in any suitable manner. It will also be seen that the levers C are convenient to the hand of such operator. When it is desired to lift the plows 18, the lever C is operated rearwardly, rotating the gear 27 in engagement with the racks 14 when the inner end of the link member 13 is lifted, the pin 15 lifting the member 17 and being operated slidably in the slots 16 at the same time. By means of the pawl 28, and the release 29, the lever may be operated several times for rotation of the gear 27 in conjunction with the dog 30. When it is desired to drop the plows, it is simply necessary to press the foot upon the operating portion 31 of the dog, and release the pawl 28, when the plows will fall downwardly by the action of gravity.

The rear end portion of the screen 25 presents a plurality of bar ends 35 having a plurality of suitable registering openings therethrough receiving a shaft 37. Disposed rearwardly of the screen 25, there is a screen 39 having a plurality of spaced bars 40 having longitudinally extending registering slots at their forward ends engaged slidably over the shaft 37. The screen 39 is suspended pivotally by means of a shaft 41 extending centrally therethrough and having upwardly offset end portions 42 engaged pivotally in suitable openings formed at the end of downwardly and rearwardly inclined rods 43 connected at their upper ends to eccentrics 44 carried upon the axle 26 adapted to vertically reciprocate the opposite sides of the screen alternately. Located rearwardly of the screen 39, there is a screen 45 of similar construction and connected therewith in a manner similar to that in which the screen 39 is engaged with the screen 25, the forward ends of the interior bars comprising the screen 45, being intermeshed with the rear ends of the bars in the screen 39, and a shaft extended through the central intermeshed portion as illustrated in Fig. 1, the slots and perforations being formed only in the central bars as will be understood. Suspended from the rear of the machine at opposite sides there are chains 46 adapted for engagement at times with a transverse shaft 47 carried by the screen 45 to hold the last named screen out of operative position at times. It will be understood that the rear end of the screen 45 lies normally upon the ground in order that potatoes may be deposited directly upon the ground thereby without jar.

Pivoted upon the frame adjacent the link 13 there is a second link 13ᵃ connected pivotally to the rack segment adjacent its upper end by a link 14ᵃ, in a manner to move the lower end of the link 13ᵃ to the same extent, vertically with the lower end of the link 13. The link 13ᵃ carries a projection 15ᵃ disposed slidably in the groove 16 so that the plows are supported in a constant relation to the vertical.

What is claimed is:—

1. A potato digger comprising a wheeled frame, pendent rearwardly extending links carried at the forward end of the frame, said links having integral rack segments extending upwardly therefrom and engaged with a gear carriage revolubly upon the frame, means for rotating the gear to lift the rear ends of the links, said links having laterally extending projections at their lower ends and plow members carried by the links and longitudinally slidable thereon.

2. A potato digger comprising a wheeled frame, pendent rearwardly extending links carried by the frame, said links having integral upwardly extending rack segments provided with rearwardly extending teeth, a revoluble gear carried by the frame in engagement with the rack segments, and means for rotating the gear; said links having lateral projections at their lower ends, plow supporting members having longitudinally extending slots engaged slidably on the projections and opposed plow members carried thereby.

3. In a potato digger, the combination with a wheeled frame, of pendent rearwardly extending link members carried at the forward end thereof, said link members having integrally formed upwardly extending rack segments, a revoluble gear carried by the machine in mesh with the rack segments, releasable check means engaged with the gear, an operating lever disposed adjacent the gear and having a releasable pawl thereon detachably engaged with the gear, said link members being provided with lateral projections at their lower ends, and plow members having longitudinally extending slots adjacent their upper ends engaged slidably upon the projections.

4. A potato digger comprising a wheeled frame, pivoted pendent rearwardly extending links carried thereby, said links having integral upwardly extending rack segments, a revoluble gear carried by the frame and in mesh with the segments, means for rotating the gear, means for holding the gear against rotation, said link members having lateral extensions at their lower ends, plow members having longitudinally extending slots engaged slidably on the projections, rearwardly projecting screen members carried by the plows, a second screen meshed with the first and suspended centrally and pivotally, and a third screen pivotally connected to the second and lying normally upon the ground, and means for holding said last named screen out of operative position at times.

5. A potato digger comprising a wheeled frame, pivoted pendent rearwardly extending links carried thereby, said links having integral upwardly extending rack segments, revoluble gears carried by the frame in mesh with the segments, means for rotating the gear, means for holding the gear at times against rotation, plow members having longitudinally extending slots, said link members having lateral projections at their lower ends engaged slidably in the slots, for vertical adjustment of the plows upon rotation of the gear, a rearwardly extending screen carried in rigid relation with the plows, a second screen pivotally and detachably engaged with the first screen at its rear edge, the second screen being centrally and pivotally supported by the frame, a third screen pivotally engaged with the rear edge of the second screen and lying normally upon the ground, at its rearward end, and means for holding the last named screen out of operative position at times.

In testimony whereof I affix my signature, in presence of two witnesses.

JOHN M. FALLICK.

Witnesses:
   A. R. LEYDA,
   EARL R. LEYDA.